Patented June 18, 1940

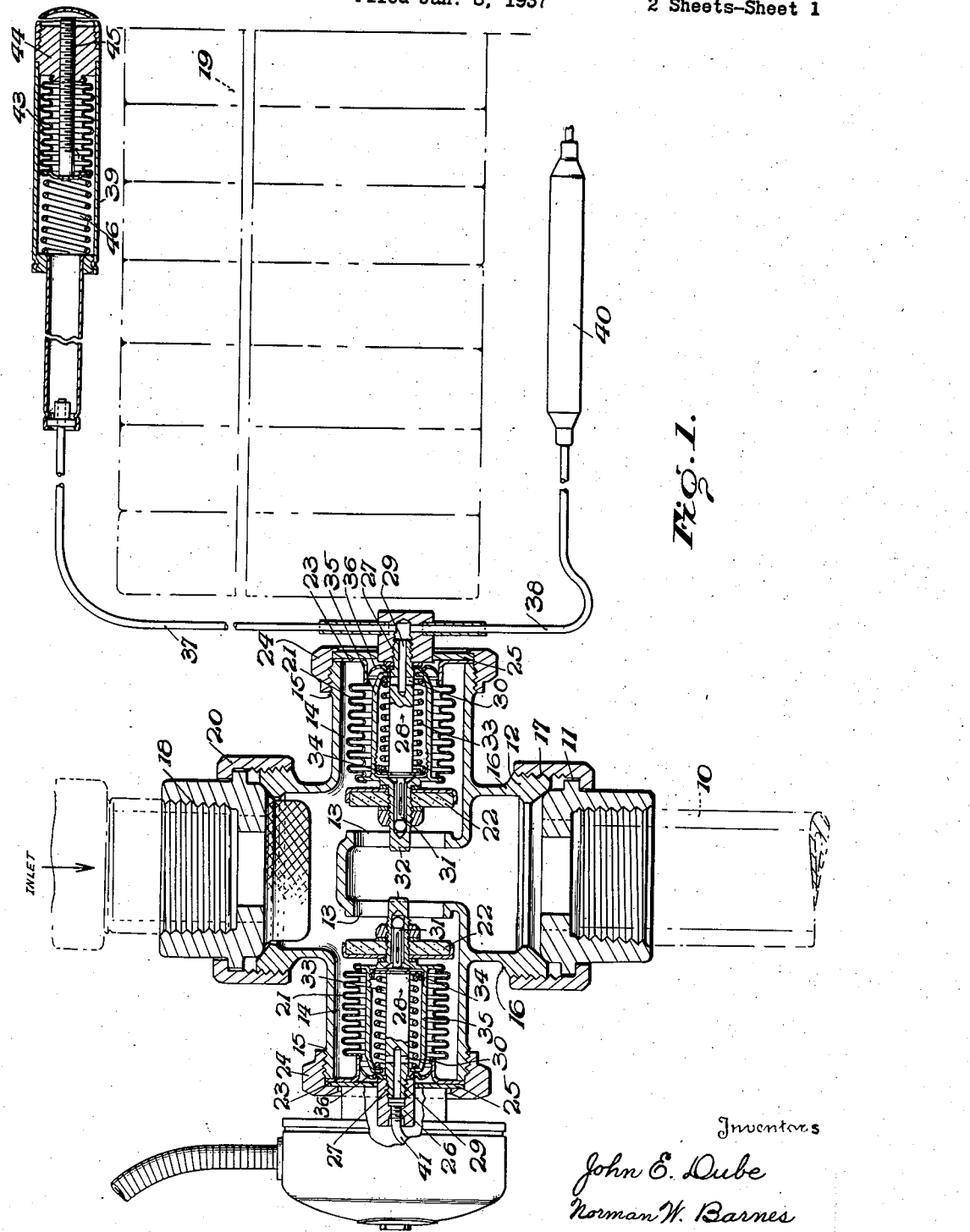

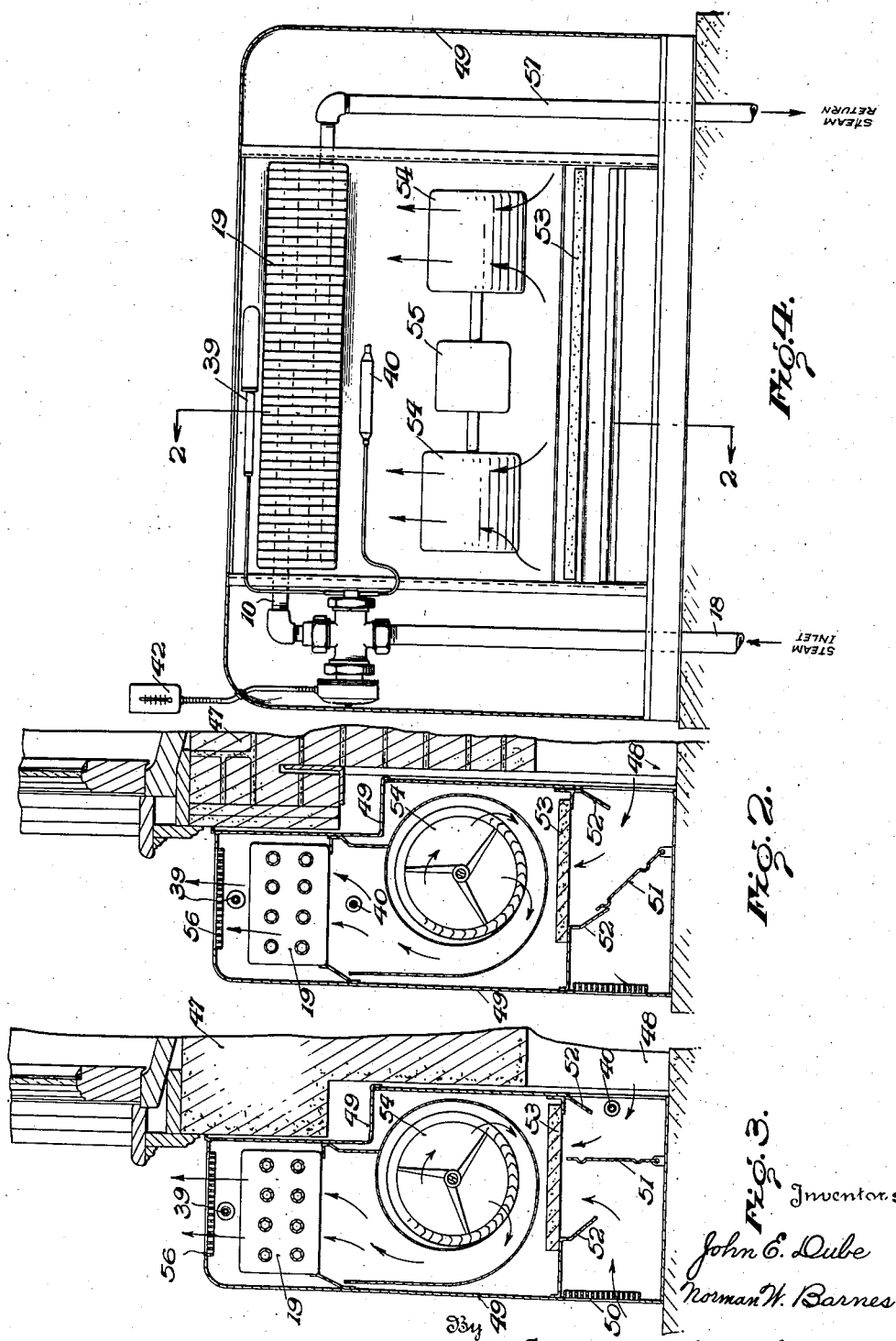

2,205,349

UNITED STATES PATENT OFFICE 2,205,349

TEMPERATURE CONTROLLING MECHANISM

John E. Dube and Norman W. Barnes, Knoxville, Tenn., assignors to The Fulton Sylphon Company, Knoxville, Tenn., a corporation of Delaware Application January 8, 1937, Serial No. 119,699

6 Claims. (Cl. 236—37)

This invention relates to controls for unit ventilators and more particularly to compensated controls of minimum air discharge temperatures for unit ventilators.

It has been found that when the air discharge temperatures of unit ventilators drop below a certain range of temperatures in the vicinity of 50 to 60° F., cold drafts will be set up in the enclosure employing the unit. To overcome this defect various control devices have been proposed which provide a thermostatic control located in the air discharge. This type of control has, however, proved inefficient and unsatisfactory inasmuch as the thermostatic control located in the air discharge will open the radiator valve of the unit ventilator when the discharge temperature drops below the predetermined minimum regardless of the temperature for which the room thermostatic control is set. These proposed devices then have a common fault, the danger of overheating in mild weather.

As is well known all automatic temperature control mechanisms must necessarily have an operating temperature range. If a valve is to begin closing at a temperature T it will be fully closed at a higher temperature T'. If this temperature differential of T'—T is too small poor temperature control will result for the valve will not assume a throttling position but will rather be either fully open or fully closed. If a larger temperature differential is selected a more even temperature control will result. A choice of a larger temperature differential will, however, result in a larger range of the control point and depending upon the load, the control point will vary from T to T'. In mild weather a small heating load must be handled by the unit to raise the discharge temperature to the desired minimum. The radiator valve will be nearly closed and the control temperature will approach T'. On a cold day the radiator valve must be wide open to obtain the allowable minimum air discharge temperature which will cause the control point to approach T. In short, depending on the outside temperature, the temperatures of the air discharge will vary within the limits T'—T with a consequent fluctuation in the room temperature. Obviously this is a most undesirable result. Further to have T high enough on cold days it will be necessary to have T' too high on mild days and, as mentioned above, since the minimum discharge control comes into play regardless of the room thermostatic control it frequently happens that overheating occurs under these conditions. Further, under these conditions when the weather is cold it is possible to underheat at least portions of the enclosure with consequent undesirable results.

It is accordingly an object of this invention to provide a control for unit ventilators which will control the temperatures of the air discharge in accordance with a temperature differential established between a given range of air discharge temperatures and the outside temperature.

Another object of this invention is to provide a control for unit ventilators which will not cause overheating of the enclosure in mild weather.

Another object of this invention is to provide a control for unit ventilators which will have a temperature differential of sufficient range to insure positive action of the control but which will not cause overheating of the enclosure in mild weather.

Another object of this invention is to provide a temperature control valve for unit ventilators which will control the minimum temperatures of the air discharge in accordance with a temperature differential established between a range of air discharge temperatures and the outside temperature.

Another object of this invention is to provide a temperature control valve for unit ventilators which will not permit overheating of the enclosure in mild weather.

A still further object of this invention is to provide a temperature control valve for unit ventilators which will have a sufficiently large operating temperature range to insure positive valve action and yet which will not permit overheating of the enclosure in mild weather.

A still further object of this invention is to provide a control valve for unit ventilators which is actuated by a thermostatic control set for the temperature of the enclosure and by a thermostatic control set for a temperature differential established between the temperature of the air discharge and the outside temperature.

A further object of this invention is to provide a control for unit ventilators which will control the temperature of the enclosure and also control the temperature of the air discharge, the two controls being independent and the control for the temperature of the air discharge being normally closed when the control for the temperature of the enclosure is open.

Another and further object of this invention is to provide a positively acting, durable and cheap control for unit ventilators that is easy to install, inconspicuous and requiring the minimum of space.

Other and further objects will appear as the description of the invention proceeds but it is to be expressly understood that the description of the accompanying drawings is for the purpose of illustration merely and that reference must be had to the appended claims to define the limits of the present invention.

In the drawings,

Fig. 1 is a sectional elevation of one embodiment of the present invention as applied to the heat intake of a unit ventilator;

Fig. 2 is a cross sectional elevation of a unit ventilator showing one location of the thermostatic controls of the embodiment of the invention shown in Fig. 1;

Fig. 3 is a cross sectional elevation of a unit ventilator showing another location of the thermostatic controls of the embodiment of the invention shown in Fig. 1; and Fig. 4 is an elevation of a unit ventilator at right angles to that shown in Fig. 2 with the thermostatic controls of the embodiment of the invention shown in Fig. 1 located for intake of outside air with no recirculation.

With reference to the drawings in which like reference characters denote like parts throughout the several views and more particularly with reference to Fig. 1, 18 represents a conduit from any suitable source of heat supply such as a boiler. Secured to conduit 18 as by coupling nut 20 is a casing 12 carrying internally oppositely disposed annular valve seats 13. Disposed opposite valve seats 13 are chambers 14 forming a part of said casing. The walls of chambers 14 are screw threaded at their outer ends as at 15. Disposed opposite conduit 18 in casing 12 is chamber 16 having its wall screw threaded at 17 and designed to receive conduit 10 leading to the heat exchanger 19, the connection being made by coupling nut 11. Heat exchanger 19 is provided with any suitable outlet conduit 57.

Mounted within chambers 14 are flexible bellows 21 providing expansible and collapsible chambers and constituting motor elements and carrying at their movable ends valve members 22 adapted for cooperation with the annular valve seats 13. The bellows 21 are mounted on annular members 23 adapted to be held firmly against the ends of chambers 14 by lock nuts 24 engaging screw threads 15. Also firmly held by lock nuts 24 are plates 25 through which extend spindle bases 26 which are internally bored and threaded as at 27 to receive spindles 28 which project axially into bellows 21. Spindles 28 are axially bored as at 29 with openings 30 leading therefrom to the interior of bellows 21. Spindles 28 are reduced in diameter and spherically shaped at their inner ends as at 31 to act as guides for the internally bored heads 32 of the movable end walls of the bellows where they project through the valve members 22. Arranged about spindles 28 are springs 33 abutting fixed spring collars 34 carried by spindles 28 at the movable ends of the bellows and engaging at their opposite ends spiders 35 carried by the movable ends of the bellows 21 so that said bellows are normally urged by said springs 33 toward collapsed position wherein the valve members 22 are in open position. Members 36 are clamped between spindles 28 and spindle bases 26 and close the outer ends of the chambers provided by the bellows 21 and are hermetically sealed to said bellows and secured to members 23 which thus support the bellows and elements attached thereto. One of spindle bases 26 is bored to receive capillary tubes 37 and 38 leading to hot bulb mechanism 39 and compensating bulb 40 respectively. The other of spindle bases 26 is bored to receive tube 41 leading to any suitable type thermostat 42 (Fig. 4). Hot bulb 39 is provided with a collapsible chamber 43 actuated by an axially stationary but rotatable nut 44 and screw 45 to move the end of said chamber with or against the action of spring 46 to vary the volume of chamber 39 to regulate the action of the thermostatic system.

With more particular reference to Figs. 2, 3 and 4, 47 represents in cross section a wall of an enclosure, or compartment to be heated and ventilated having therein a conduit 48 opening to the outside atmosphere. Covering conduit 48 and arranged adjacent wall 47 and inside of this enclosure is unit ventilator housing 49 which may be constructed of any suitable material either integral with or as a unit separate from wall 47. Arranged at the base of cover 49 are recirculation louvres 50. Disposed between louvres 50 and conduit 48 is damper 51 cooperating with baffles 52 to control recirculation and outside air intake. Arranged above damper 51 is air filter 53. Spaced above filter 53 and designed to draw air therethrough are fans 54 driven by motor 55. Fans 54 draw air through filter 53, force it past heat exchanger 19 and out into the enclosure through outlet louvres 56.

In Fig. 2 damper 51 is in closed position to cut off any recirculation of inside air. In this position of damper 51 the unit ventilator is drawing in outside air only. For this condition, that is when the unit ventilator is drawing in outside air only, it has been found preferable but not necessary to locate compensating bulb 40 between fans 54 and heat exchanger 19. For intermediate positions of damper 51 (Fig. 3) when both recirculating air and outside air are being passed through the unit ventilator it has been found preferable but not necessary to locate compensating bulb 40 in the mouth of conduit 48 in the direct path of the air drawn in from the outside.

Suppose that the above described unit ventilator is installed and that the room thermostat 42 is set for a temperature higher than that existing in the enclosure and further suppose the hot bulb mechanism 39 and compensating bulb 40 are adjusted for a minimum temperature range of from 50 to 60° F., as above described. Under these conditions the left hand valve (reference is made hereafter to Fig. 1 unless otherwise noted) actuated by room thermostat 42 will be open and steam from inlet 18 will pass to the heat exchanger 19. The temperature adjacent hot bulb 39 will then be greater than the minimum set and the vaporizable medium will be forced from bulb 39 to the right hand bellows 21 and will there be vaporized by the incoming steam and will act to expand right hand bellows 21 and close the right hand valve. The left hand valve will remain open until such a time when the temperature of the enclosure reaches that set on thermostat 42. When this condition exists volatile fluid will be forced into left hand bellows 21 and will there be volatilized by the action of the incoming steam and will act to close the left hand valve. So long as the left hand valve is admitting any steam to the heat exchanger the temperature in hot bulb 39 will usually be sufficiently greater than the minimum set to act to keep the right hand valve shut.

Assume that the room thermostat 42 is satisfied, then the left hand valve will be closed, and further assume that the unit ventilator is taking in sufficient outside air to reduce the temperature of the air leaving outlet louvres 56 below the minimum set. In order to prevent this cold air from causing drafts and damaging the heat exchanger by freezing if the temperature be that low, it becomes necessary to heat this air up to the minimum set regardless of the demands of the room thermostat. This cold air passing over hot bulb 39 will act to chill and contract the volatile liquid therein and volatile liquid will be drawn from the right hand bellows 21. The pressure in right hand bellows 21 will then be reduced and bellows 21 will collapse and open the right hand valve and allow steam to pass to the heat exchanger to heat the incoming cold air. The right hand valve will remain open until such a time when the incoming air is heated sufficiently to expand the volatile liquid in hot bulb 39 to force it into right-hand bellows 21. However, compensating bulb 40 is in communication with hot bulb 39 and said right-hand bellows 21, and as its temperature is controlled by the air flowing thereover, the pressure of the volatile liquid that can exist in said compensating bulb 40 is controlled by the temperature of the air circulating thereover. Therefore, compensating bulb 40 must be satisfied before hot bulb 39 can force enough liquid into right hand bellows 21 to be volatilized therein and create the necessary closing pressure. It is apparent from the above that the lower the temperature at compensating bulb 40 the higher the temperature at hot bulb 39 must be to first satisfy said bulb 40 before the requisite pressure can be built up in the right-hand bellows to close the right hand valve. The converse is also equally true. Therefore by this compensating control the minimum discharge temperature is raised or lowered as the outdoor temperature becomes lower or higher respectively. Moreover, by appropriate adjustment of hot bulb 39 and compensating bulb 40 any desired compensation may be had.

As will now be apparent a novel compensated control of minimum air discharge temperatures for unit ventilators has been provided by the present invention that has independent temperature controls governing the temperature of the enclosure and the temperature of the air discharge; that has an adequate operating temperature differential and yet one which will not cause overheating of the enclosure in mild weather and which is durable, cheap, compact, easy to install and positive in operation.

It will also be apparent to those skilled in the art that the invention is not necessarily limited to the exact forms of construction shown but is capable of a variety of mechanical embodiments; and that changes may be made in the above described embodiment without departing from the spirit of the invention. Reference is therefore to be had to the appended claims for a definition of the limits of the invention.

What is claimed is:

1. In a control for a ventilating system including a housing with an inlet and an outlet for the air and a single heat exchanger within said housing provided with an inlet for the heating medium, said heating medium inlet having two valve ports through either of which the heating medium may flow to said single heat exchanger, a valve member cooperating with each of said respective ports, means operatively connected to one of said valve members for closing the same to prevent the passage of heating medium when the temperature of the space to be ventilated has reached a predetermined maximum, and means operatively connected to the other of said valve members for operating the same to temper the air flowing through said housing when said first named valve member is closed, said first named means including a motor vessel operatively connected to said first named valve member and in communication with means subjected exteriorly of said housing to the temperature of the space to be ventilated, and said tempering means including a motor element operatively connected to said second named valve member and a pair of bulbs in communication with said motor element, one subjected to the temperature of the air at the outlet side of said heat exchanger and the other subjected to the temperature of the air at the inlet side of said heat exchanger, said last named motor element and bulb being charged with a volatile liquid, said first named bulb being of such size as to actuate said second named motor element and open said second named valve member at a temperature always below said temperature at which said first named motor element is effective to close said first named valve member but varying with the temperature of the air in the inlet to the heat exchanger, and said second named bulb being of such size as to predeterminately increase the temperature at which said first named bulb closes said second named valve member as the temperature of the air in said air inlet decreases.

2. In a control for a ventilating system including a housing with an inlet and an outlet for the air and a single heat exchanger within said housing provided with an inlet for the heating medium, said heating medium inlet having two valve ports through either of which the heating medium may flow to said single heat exchanger, a valve member cooperating with each of said respective ports, means operatively connected to one of said valve members for closing the same to prevent the passage of heating medium when the temperature of the space to be ventilated has reached a predetermined maximum, means operatively connected to the other of said valve members for operating the same to temper the air flowing through said housing when said first named valve member is closed, said first named means including a motor vessel operatively connected to said first named valve member and in communication with means subjected exteriorly of said housing to the temperature of the space to be ventilated, and said tempering means including a motor element operatively connected to said second named valve member and a pair of bulbs in communication with said motor element, one subjected to the temperature of the air at the outlet side of said heat exchanger and the other subjected to the temperature of the air at the inlet side of said heat exchanger, said last named motor element and bulbs being charged with a volatile liquid, said first named bulb being of such size as to actuate said second named motor element and open said second named valve member at a temperature always below said temperature at which said first named motor element is effective to close said first named valve member but varying with the temperature of the air in the inlet to the heat exchanger, and said second named bulb being of such size as to predeterminately increase the temperature at which said first named bulb closes said second named valve member as the temperature of the air in said air inlet decreases, and means for adjusting said first named bulb to vary the temperature at which said bulb effects the operation of said second named valve member.

3. In a control for a ventilating system including a housing with an inlet and an outlet for the air and a single heat exchanger within said housing provided with an inlet for the heating medium, said heating medium inlet having two valve ports through either of which the heating medium may flow to said single heat exchanger, a valve member cooperating with each of said respective ports, means operatively connected to one of said valve members for closing the same to prevent the passage of heating medium when the temperature of the space to be ventilated has reached a predetermined maximum, and means operatively connected to the other of said valve members for operating the same to temper the air flowing through said housing when said first named valve member is closed, said first named means including a motor vessel operatively connected to said first named valve member and in communication with means subjected exteriorly of said housing to the temperature of the space to be ventilated, and said tempering means including a motor element operatively connected to said second named valve member and a pair of bulbs in communication with said motor element, one subjected to the temperature of the air at the outlet side of said heat exchanger and the other subjected to the temperature of the air at the inlet side of said heat exchanger, said last named motor element and bulbs being charged with a volatile liquid, and said second named motor element being subjected to the heat of the heating medium whereby it constitutes a vaporizing chamber for said volatile liquid, said first named bulb being of such size as to actuate said second named motor element and open said second named valve member at a temperature always below said temperature at which said first named motor element is effective to close said first named valve member but varying with the temperature of the air in the inlet to the heat exchanger, and said second named bulb being of such size as to predeterminately increase the temperature at which said first named bulb closes said second named valve member as the temperature of the air in said air inlet decreases.

4. In a control for a ventilating system including a housing with an inlet and an outlet for the air and a single heat exchanger within said housing provided with an inlet for the heating medium, said heating medium inlet having two valve ports through either of which the heating medium may flow to said single heat exchanger, a valve member cooperating with each of said respective ports, means operatively connected to one of said valve members for closing the same to prevent the passage of heating medium when the temperature of the space to be ventilated has reached a predetermined maximum, means operatively connected to the other of said valve members for operating the same to temper the air flowing through said housing when said first named valve member is closed, said first named means including a motor vessel operatively connected to said first named valve member and in communication with means subjected exteriorly of said housing to the temperature of the space to be ventilated, and said tempering means including a motor element operatively connected to said second named valve member and a pair of bulbs in communication with said motor element, one subjected to the temperature of the air at the outlet side of said heat exchanger and the other subjected to the temperature of the air at the inlet side of said heat exchanger, said last named motor element and bulbs being charged with a volatile liquid, and said second named motor element being subjected to the heat of the heating medium whereby it constitutes a vaporizing chamber for said volatile liquid, said first named bulb being of such size as to actuate said second named motor element and open said second named valve member at a temperature always below said temperature at which said first named motor element is effective to close said first named valve member but varying with the temperature of the air in the inlet to the heat exchanger, and said second named bulb being of such size as to predeterminedly increase the temperature at which said first named bulb closes said second named valve member as the temperature of the air in said air inlet decreases, and means for adjusting said first named bulb to vary the temperature at which said bulb effects the operation of said second named valve member.

5. In a control for a ventilating system including a housing with an inlet and an outlet for the air and a single heat exchanger within said housing provided with an inlet for the heating medium, said heating medium inlet having two valve ports through either of which the heating medium may flow to said single heat exchanger, a valve member cooperating with each of said respective ports, means operatively connected to one of said valve members for closing the same to prevent the passage of heating medium when the temperature of the space to be ventilated has reached a predetermined maximum, and means operatively connected to the other of said valve members for operating the same to temper the air flowing through said housing when said first named valve member is closed, said first named means including a motor vessel operatively connected to said first named valve member and in communication with means subjected exteriorly of said housing to the temperature of the space to be ventilated, and said tempering means including a motor element operatively connected to said second named valve member and means operatively connected to said last named motor element and respectively subjected to the air temperatures in said air inlet and said air outlet and responsive to the difference in air temperatures thereat to open said second named valve member when the temperature of the air in said air outlet decreases after closure of said first named valve member to a temperature which varies with the temperature of the air in said air inlet, said means subjected to the air in said air inlet operating to vary said temperature at which said last named valve member is opened inversely to variations of temperature in said air inlet.

6. In a control for a ventilating system including a housing with an inlet and an outlet for the air and a single heat exchanger within said housing provided with an inlet for the heating medium, said heating medium inlet having two valve ports through either of which the heating medium may flow to said single heat exchanger, a valve member cooperating with each of said respective ports, means operatively connected to one of said valve members for closing the same to prevent the passage of heating medium when the temperature of the space to be ventilated has reached a predetermined maximum, means operatively connected to the other of said valve members for operating the same to temper the air flowing through said housing when said first named valve member is closed, said first named means including a motor vessel operatively connected to said first named valve member and in communication with means subjected exteriorly of said housing to the temperature of the space to be ventilated, and said tempering means including a motor element operatively connected to said second named valve member and means operatively connected to said last named motor element and respectively subjected to the air temperatures in said air inlet and said air outlet and responsive to the difference in air temperatures thereat to open said second named valve member when the temperature of the air in said air outlet decreases after closure of said first named valve member to a temperature which varies with the temperature of the air in said air inlet, said means subjected to the air in said air inlet operating to vary said temperature at which said last named valve member is opened inversely to variations of temperature in said air inlet, and manually operable means to adjust said tempering means and vary the temperature at which it effects the operation of said second named valve member.

JOHN E. DUBE.
NORMAN W. BARNES.